United States Patent [19]
Nishimura et al.

[11] Patent Number: 5,461,697
[45] Date of Patent: Oct. 24, 1995

[54] SPEAKER RECOGNITION SYSTEM USING ENURAL NETWORK

[75] Inventors: Shingo Nishimura; Masashi Miyakawa; Masayuki Umino; Shigenobu Nonaka, all of Ibaraki, Japan

[73] Assignee: Sekisui Kagaku Kogyo Kabushiki Kaisha, Tokyo, Japan

[21] Appl. No.: 150,785

[22] Filed: Nov. 12, 1993

Related U.S. Application Data

[63] Continuation of Ser. No. 757,292, Sep. 10, 1991, abandoned, which is a continuation-in-part of Ser. No. 434,391, Nov. 13, 1989, abandoned.

[30] Foreign Application Priority Data

| Nov. 17, 1988 | [JP] | Japan | 63-291837 |
| Apr. 14, 1989 | [JP] | Japan | 1-96127 |
| Apr. 14, 1989 | [JP] | Japan | 1-96128 |
| Apr. 14, 1989 | [JP] | Japan | 1-96129 |
| Apr. 14, 1989 | [JP] | Japan | 1-96130 |
| Apr. 14, 1989 | [JP] | Japan | 1-96131 |

[51] Int. Cl.⁶ ............................................. G10L 9/00
[52] U.S. Cl. ............................... 395/2.41; 395/2.11
[58] Field of Search .................. 395/2.11, 2.41, 395/2.55, 2.6

[56] References Cited

U.S. PATENT DOCUMENTS 4,975,961  12/1990  Sakoe ................................... 381/43
5,027,406  6/1991  Roberts et al. ........................ 395/2

OTHER PUBLICATIONS

Lippmann et al., "Neural—Net Classifiers Useful for Speech Recognition", IEEE 1st International Conf. on Neural Networks, Jun. 21–24, 1987, pp. 417–425.
Neurocomputer applications by Robert Hecht–Nielsen, Hect—Neilsen Neurocomputer Corporation, San Diego pp. 239, 241–244, 1987.
Gately, Michael T., *Overview of Neural Networks*, Jul. 17, 1988, pp. 2–6.
Caudill, Maureen, *Neural Networks Primer Part I*, AI Expert, Dec. 1987, pp. 46–52.
Caudill, Maureen, *Neural Networks Primer Part II*, AI Expert, Feb. 1988, pp 55–61.
Caudill, Maureen, *Neural Networks Primer Part III*, AI Expert, Jun. 1988, pp. 53–59.
Caudill, Mauren, *Neural Networks Primer Part IV*, AI Expert, Aug. 1988, pp. 61–67.
Caudill, Maureen, *Neural Networkds Primer Part V*, AI Expert, Nov. 1988, pp. 57–65.

*Primary Examiner*—Allen R. MacDonald
*Assistant Examiner*—Michelle Doerrler
*Attorney, Agent, or Firm*—Sughrue, Mion, Zinn, Macpeak & Seas

[57] ABSTRACT

A speaker recognition system for recognizing a speaker from an input voice using a neural network, in which a feature quantity extracted from the input voice is timewise averaged to create an input pattern to the neural network. The averaging technique is such that the input voice is equally divided timewise into a plurality of blocks in a simple manner and that such feature quantity is averaged every block. The feature quantity includes a frequency characteristic, pitch frequency, linear prediction coefficient, and partial self-correlation (PARCOR) coefficient of the voice.

8 Claims, 13 Drawing Sheets

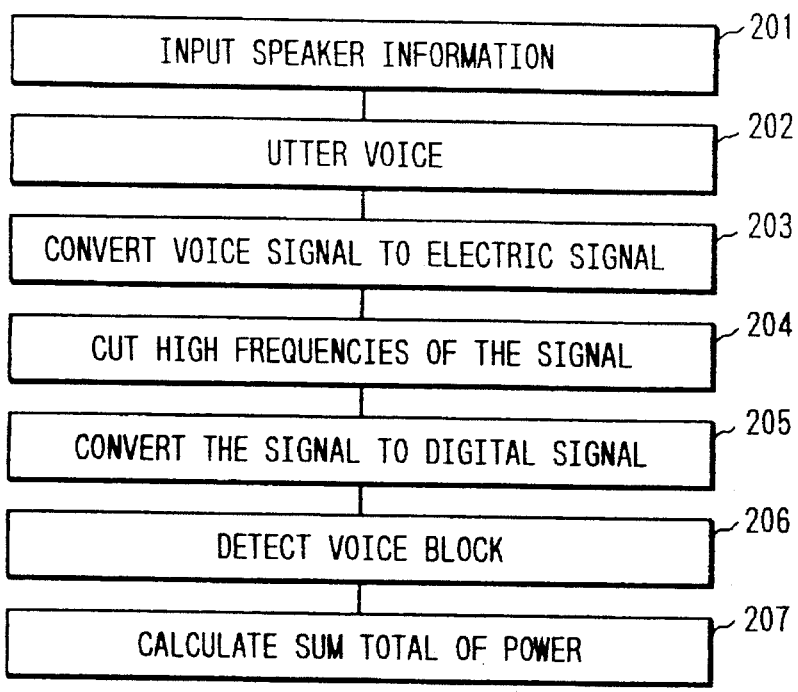
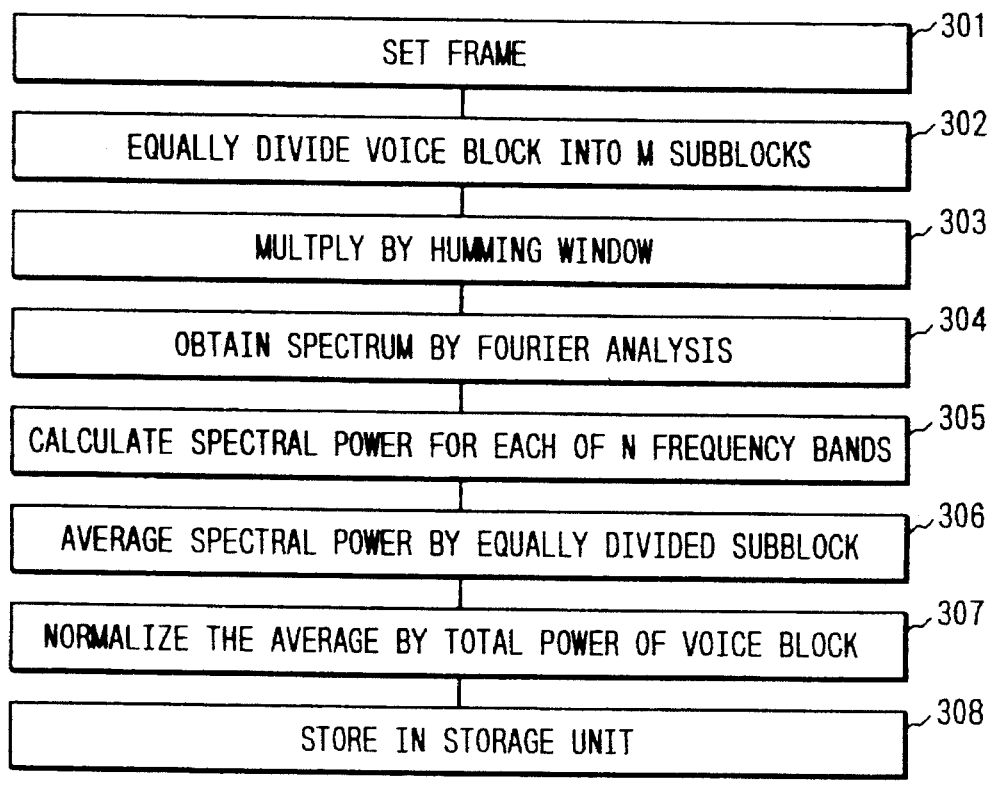

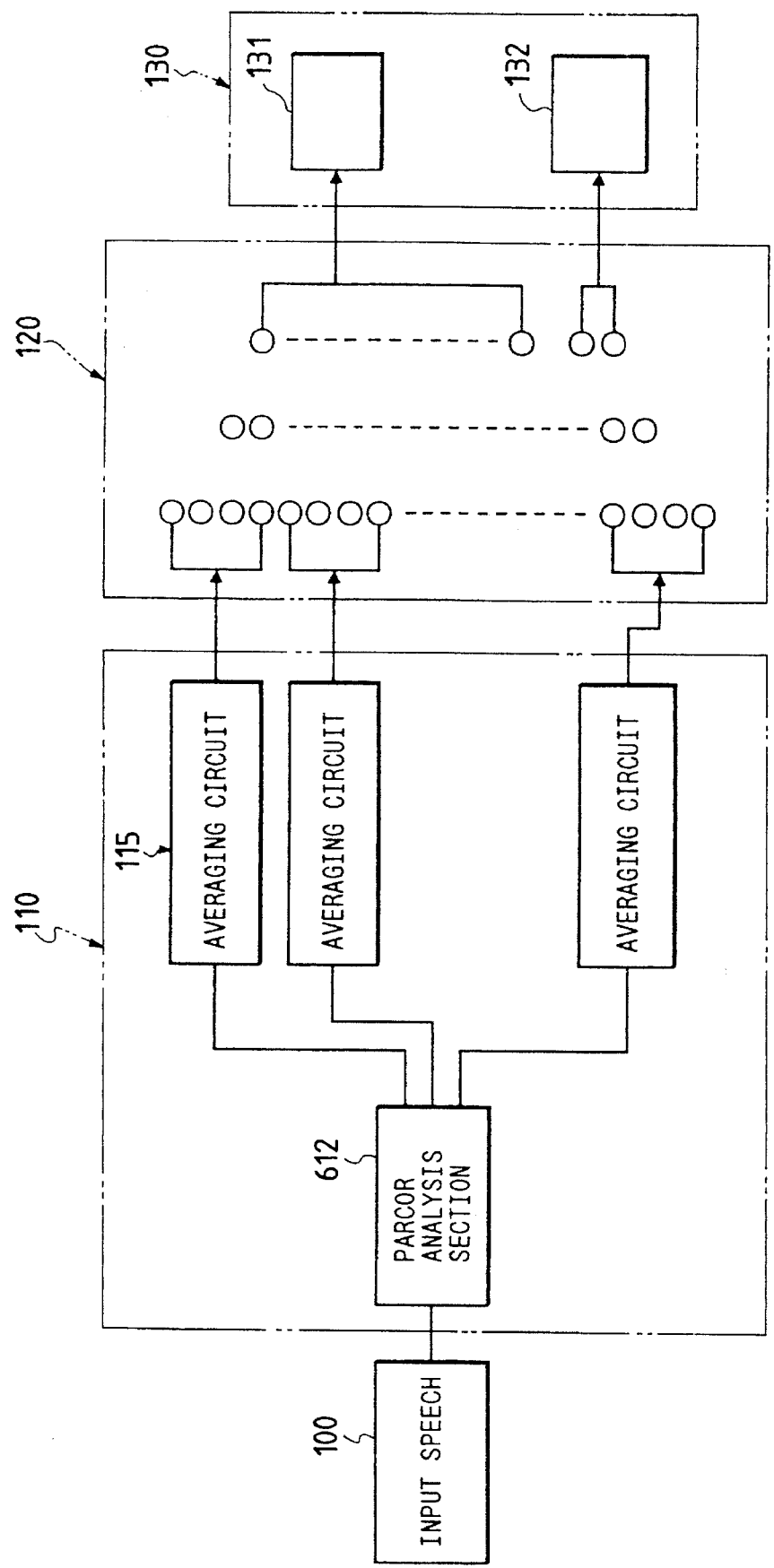

5,461,697

SPEAKER RECOGNITION SYSTEM USING ENURAL NETWORK

This is a Continuation of application Ser. No. 07/757,292 filed Sep. 10, 1991 now abandoned which is a Continuation-in-Part of application Ser. No. 07/434,391, filed Nov. 13, 1989, now abandoned.

BACKGROUND OF THE INVENTION

The invention relates to a speaker recognition system suitable for identifying or verifying the speaker of an input voice at an on-line terminal or the like. More particularly, it is directed to a speaker recognition system using a neural network.

The term "speaker recognition" means the recognition of a speaker from an input voice and comes in two forms: speaker identification and speaker verification.

The term "speaker identification" means a judgment on who an input voice represents among registered speakers, while the term "speaker verification" means a judgment on whether or not the input voice can be recognized as the voice of a registered speaker.

Conventional speaker recognition systems are proposed in e.g., Japanese Patent Examined Publication No. 13956/1981 and the Transactions of the Institute of Electronics and Communication Engineers of Japan, Nov. 1973, Vol. 56-A No. 11 (Reference 1).

The result of supplementary tests conducted on the conventional speaker recognition system disclosed in Reference 1 will be described with reference to FIG. 1.

The high frequency components of an input voice are cut (eliminated) by a 4.2 kHz low-pass filter (LPF) (Step 101), and sampled at a cycle of 10 kHz and quantized in 16 bits (Step 102). Then, blocks of 25.6 msec are extracted at a cycle of 12.8 msec to set a frame (Step 103). After multiplied by a humming window (Step 104), the input voice is subjected to a PARCOR (partial self-correlation) analysis. And a block containing the voice sound is detected, and the pitch and the PARCOR coefficient are extracted (Step 105). From the analysis result, an average, a standard deviation, and a correlation matrix are calculated (Step 106), and a feature quantity specific to a speaker included in the input voice is extracted from these data (Step 107).

Then, distances between the standard patterns of respective registered speakers which have similarly been extracted in advance and an input evaluation pattern are calculated (Step 108).

For speaker identification, a speaker who corresponds to the standard pattern whose distance from the input evaluation pattern is the shortest is judged to be the speaker of the input voice, while for speaker verification, the speaker of the input voice is judged to be an unregistered speaker if the distances from the standard patterns of all the speakers exceed a predetermined threshold (Step 109).

Further, the feature quantity disclosed in Japanese Patent Examined Publication No. 13956/1981 includes a correlation between spectral parameters calculated from an input voice, an average of the respective parameters, and a standard deviation.

However, the conventional speaker recognition systems exhibit impairment in recognition rate as the time elapses (e.g., hours or days from the creation of the standard patterns if only a single word is used for their judgment. Reference 1 presents an exemplary case where the speaker identification rate is decreased from 100% to 85% and where the speaker verification rate is decreased from 99% to 91% after three months from the creation of the standard patterns.

To ensure acceptable rates, a plurality of words (about 4 words) must be inputted, which is disadvantageously time-consuming in feature quantity extraction and distance calculation (about 30 seconds), further making real-time processing difficult.

SUMMARY OF THE INVENTION

An object of the invention is to obtain a speaker recognition system capable of implementing real-time processing easily while making secular deterioration in the recognition rates extremely small.

The speaker recognition system of the invention is of such a type that a speaker is recognized from an input voice using a neural network. A feature quantity extracted from the voice is averaged timewise and the obtained average is used as an input pattern to the neural network. The averaging technique involves simple division of the input voice into a plurality of equally divided blocks and block-based averaging.

The feature quantity of the input voice in the invention includes: the frequency characteristic, pitch frequency, linear prediction coefficient (LPC), and PARCOR coefficient of the voice.

The term "pitch frequency" means the reciprocal of a repetitive cycle of a vocal cord waveform (pitch cycle). The LPC and the PARCOR coefficient are defined as follows. It is well known that there generally exists a high proximity correlation between the sampled values $\{\chi n\}$ of the voice waveform. Therefore, let it be assumed that the following linear prediction can be made.

$$\text{Linear prediction value} \quad \hat{\chi}_t = -\sum_{i=1}^{p} \alpha_i \chi_{t-i} \quad (1)$$

$$\text{Linear prediction error} \quad \epsilon_t = \chi_t - \hat{\chi}_t \quad (2)$$

where $\chi_t$ is the sampled value of a voice waveform at a timing t, and $\{\alpha_i\}$ (i=1, ..., p) is the linear prediction coefficient of order p.

To implement the invention, the linear prediction coefficient $\{\alpha_i\}$ is calculated so that the square of an average of the linear prediction error $\epsilon_t$ is minimized. Specifically, $(\epsilon_t)^2$ is calculated and its average in terms of time is expressed as $\overline{(\epsilon_t)^2}$, and by setting $\partial \overline{(\epsilon_t)^2}/\partial \alpha_i = 0$ (i=1, 2, ..., P), $\{\alpha_i\}$ can be calculated from the following equation.

$$\sum_{i=0}^{p} \alpha_i V_{|i-j|} = 0 \quad (3)$$

Here, if $[K_n]$ (n=1, ..., p) is the PARCOR coefficient of order p, a PARCOR coefficient $K_{n+1}$ can be defined as a normalized correlation coefficient between a forward remainder $\epsilon_t^{(f)}$ and a backward remainder $\epsilon_{t-(n+1)}^{(b)}$ by the following equation.

$$K_{n+1} = \frac{\overline{\epsilon_t^{(f)} \cdot \epsilon_{t-(n+1)}^{(b)}}}{\sqrt{\overline{(\epsilon_t^{(f)})^2}} \cdot \sqrt{\overline{(\epsilon_{t-(n+1)}^{(b)})^2}}} \quad (4)$$

where $\epsilon_t^{(f)} = \chi_t - \sum_{i=1}^{n} \alpha_i \chi_{t-i}$

{α$_i$} is the forward prediction coefficient, $$\epsilon^{(b)}_{t-(n+1)} = \chi_{t-(n+1)} - \sum_{j=0}^{i} \beta_j \chi_{t-j}$$

{β$_i$} is the backward prediction coefficient.

According to the speaker recognition system of the invention, the feature quantity extracted from the voice is averaged timewise to form an input pattern to the neural network. As a result, the time required for completing the recognition process can be curtailed by about 1 second. In addition, single word input instead of the conventional 4-word input can ensure accurate recognition, and the secular deterioration of the recognition rates can thus be reduced substantially.

BRIEF DESCRIPTION OF THE DRAWINGS

FIG. 8 is a flow chart of a voice input section in a learning mode;

FIG. 9 is a flow chart of the preprocessing section in the learning mode;

FIGS. 14 to 18 are schematic diagrams specifically showing the speaker recognition system of the invention.

DETAILED DESCRIPTION OF THE PREFERRED EMBODIMENT

Outline of Neural Network

Prior to a description of a specific embodiment of the invention, a neural network will be outlined.

Figure 1:
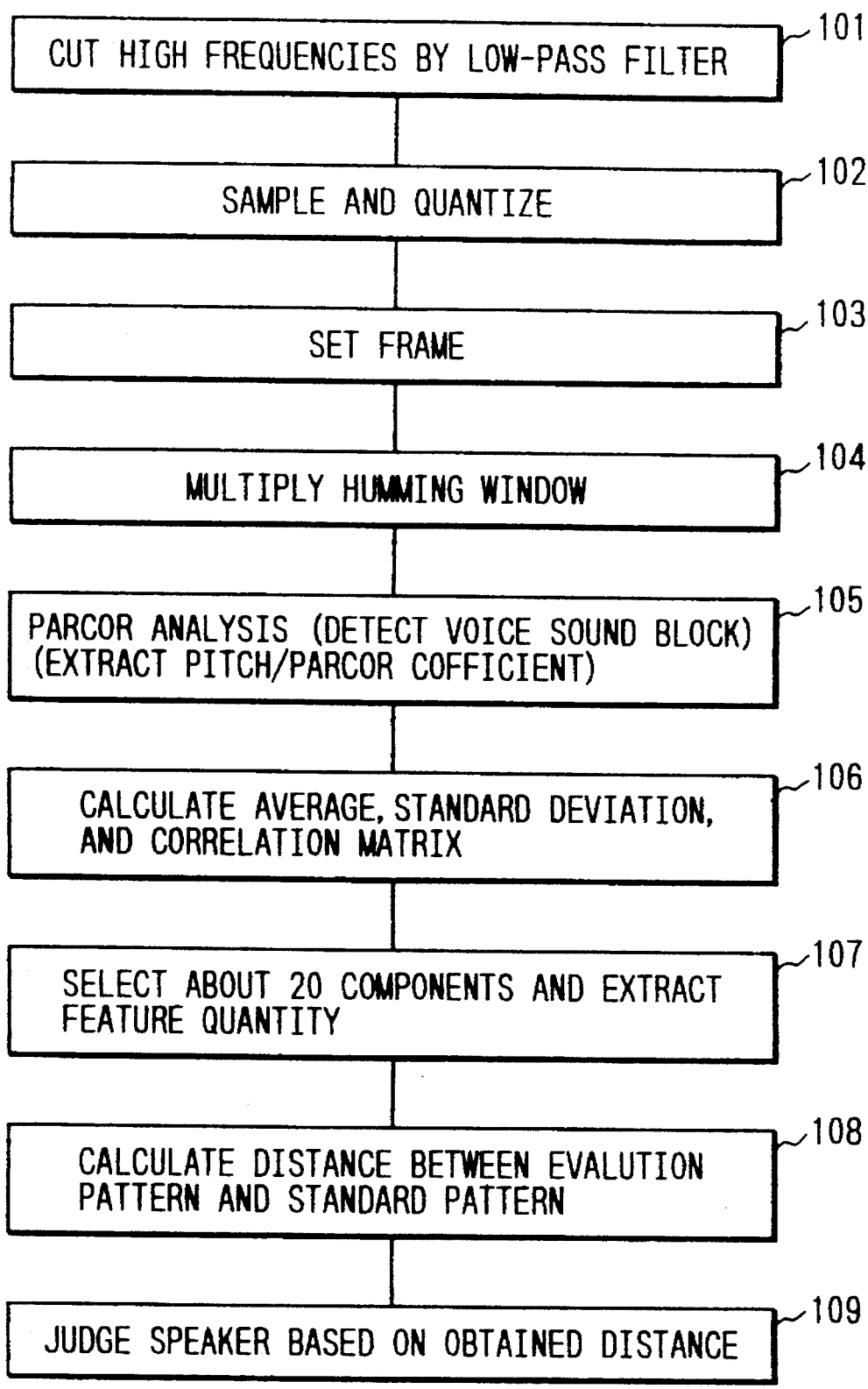
FIG. 1 is a flow chart showing an exemplary conventional speaker recognition system.
Figure 2A:
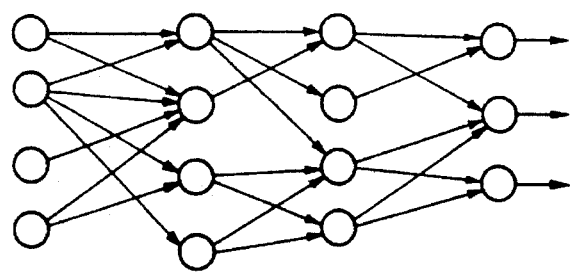
FIGS. 2A and 2B are schematic diagrams showing a neural network.
Figure 2B:
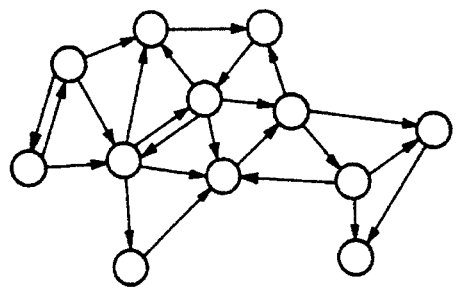

The neural network can roughly be classified into two types from its structure: a layered network shown in FIG. 2A and a mutually connected network shown in FIG. 2B. While the invention may adopt either type of network, the layered network will be used in the invention since a learning algorithm (described later) is established in the layered network.

Figure 3:
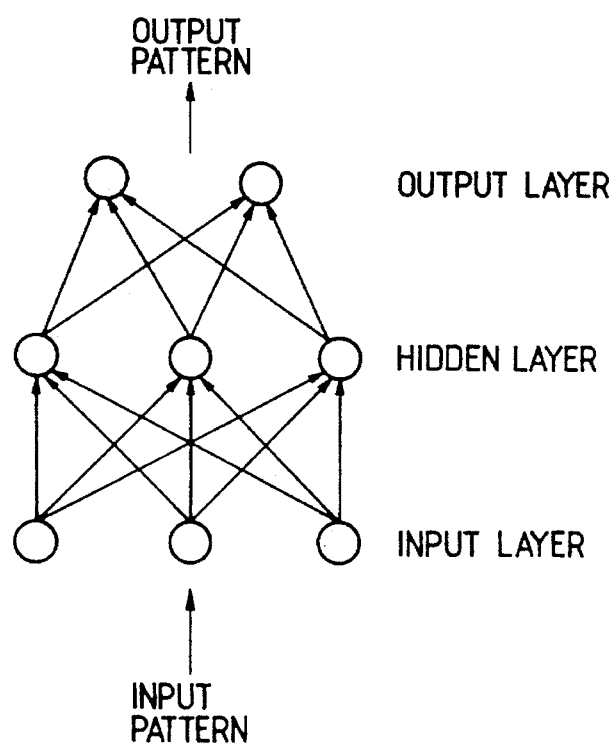
FIG. 3 is a schematic diagram showing the layered aspect of the neural network.

As shown in FIG. 3, the layered network includes: an input layer, a hidden (intermediate) layer, and an output layer. Each layer consists of one or more units and the connection of the layers is only "forward", meaning that the input layer is unidirectionally connected to the hidden layer and that the hidden layer is unidirectionally connected to the output layer; there is no intra-layer connection.

Figure 4:
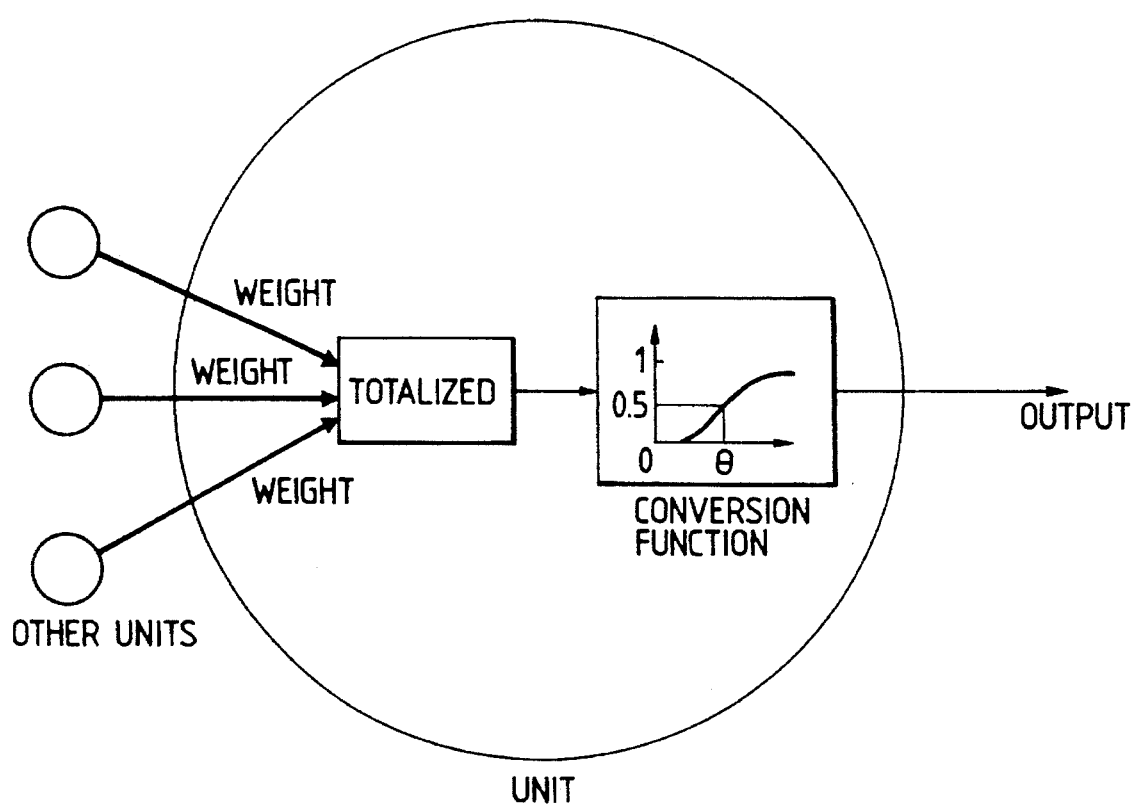
FIG. 4 is a schematic diagram showing units of the neural network.

As shown in FIG. 4, each unit is modelled on the neuron of a brain and its structure is simple. It receives inputs from other units, calculates their sum total, converts the calculated sum total under a predetermined rule (a conversion function), and outputs the result. For connection to other units, variable weights, each representing a degree of connection strength, are added.

The term "learning by the network" means the processing that directs an actual output toward a target value (a desirable output). Learning is generally performed varying the conversion function and the weight for connection specific to each unit shown in FIG. 4.

An exemplary algorithm of learning is the back propagation disclosed in "Parallel Distributed Processing" (Rumelhart, D. E., McClelland, J. L. and the PDP Research Group, the MIT Press, 1986) (Reference 2).

System Configuration

Figure 6:
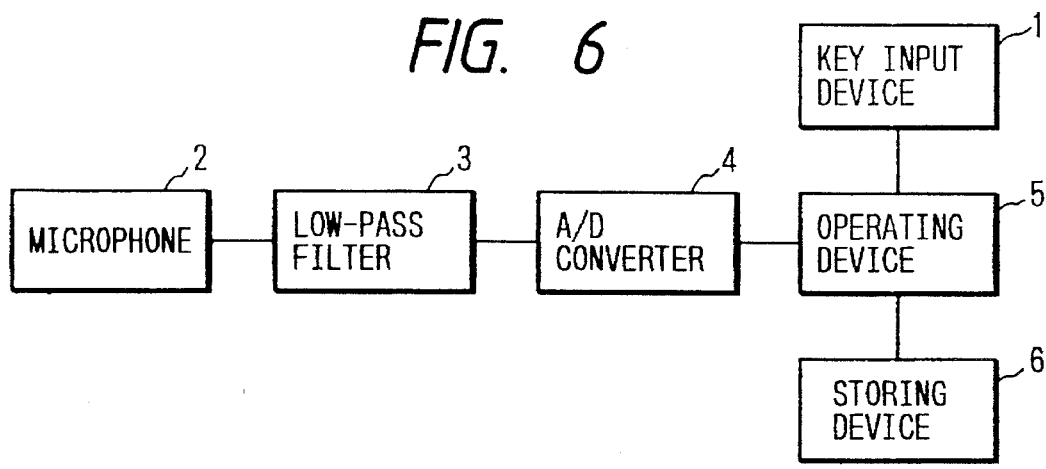
FIG. 6 is a diagram showing the configuration of a system of the invention.

A schematic diagram showing the system configuration of the invention is presented in FIG. 6. Using an input device 1 such as a keyboard, a desired function or mode (learning mode/activation mode) and speaker information are specified at the time of learning. Then, a voice inputted from, e.g., a microphone 2 has the high-frequency components of its signal cut (eliminated) by a low-pass filter 3. After converted into a digital signal by an A/D converter 4, the thus processed voice signal is received by an arithmetic and logic operation device 5 such as a computer for speaker recognition processing. A storage unit 6 is also provided to store the results of the processed input voice and the structure of the neural network.

Outline of Speaker Recognition System

Figure 7:
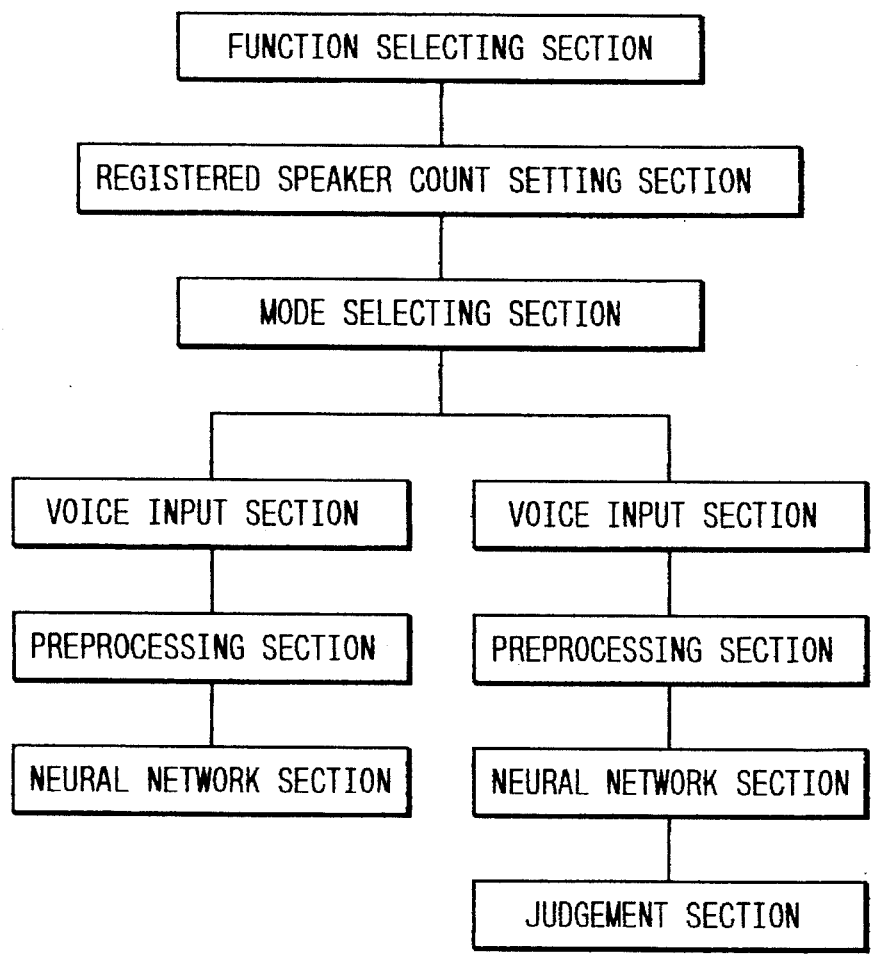
FIG. 7 is a diagram showing the general flow of a speaker recognition system of the invention.

To recognize a speaker by the neural network, the neural network must first learn. A general flow of learning is shown in FIG. 7, including a flow at the time the system is activated upon completion of the learning.

Prior to causing the neural network to learn, the system is initialized by a keyboard input. The user selects through the system a desired function: speaker identification (who the input voice represents is identified among the preregistered speakers), speaker verification (whether or not the input voice is of a preregistered speaker is recognized), or both <function selection section>. Then, the number of preregistered speakers is set <registered speaker count setting section>. In response to these setting operations, the system prepares a neural network having a structure necessary for implementing the selected function. By "necessary structure" it is intended to mean the number of units in each layer of the three-layered neural network, the detail of which will be described later. Further, to provide the system with the speaker recognition functions, either a mode in which the neural network learns (learning mode) or a mode in which the system is actually activated using the neural network that has completed the learning operation (activation mode) is selected <mode selection section>. Processing of each mode will be briefly described below.

Figure 5:
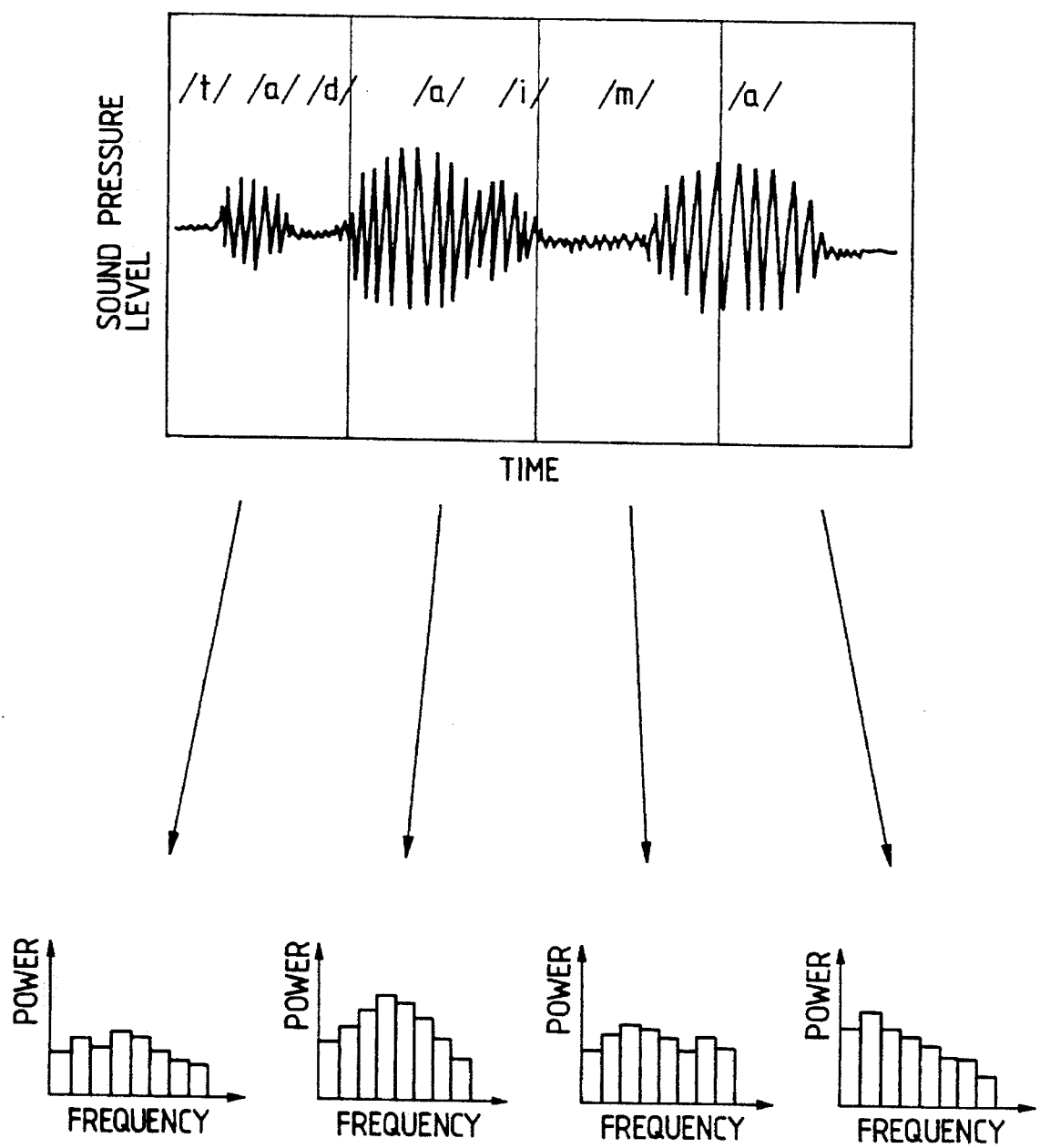
FIG. 5 is a diagram illustrating processing at a preprocessing section.

In the learning mode, after having inputted speaker information (who the speaker is among the registered speakers for speaker identification, and whether or not the speaker is a registered speaker for speaker verification) from the input device 1, a voice is inputted from the microphone 2 <voice input section>. The input voice is subjected to preprocessing, and an input pattern to the neural network is extracted to collect learning patterns <preprocessing section> (see FIG. 5). After the learning patterns have been extracted based on all the learning material, the neural network is caused to learn about to whose voice each learning pattern corresponds (for speaker identification) or about whether or not the voice corresponds to a registered speaker (for speaker verification) <neural network section>.

Once the learning has been completed on the part of the neural network, the system is activated, so that the speaker recognition functions can be executed. The voice inputted from the microphone 2 or the like <voice input section> is subjected to preprocessing, and the input pattern to the neural network is extracted <preprocessing section> (see FIG. 5). The extracted pattern is then inputted to the neural network that has completed the learning process <neural network section>, and judgment on the speaker is made from the result <judgment section>.

Details of Speaker Recognition System (Learning Mode)

The learning mode in the speaker recognition system of the invention will now be described in detail.

A detailed flow chart of the processing performed by the voice input section in the learning mode is shown in FIG. 8. After having inputted from the input device 1 the speaker information regarding who, among the registered speakers, the speaker is that is about to speak (for speaker identification), or whether the speaker is a registered speaker or a unregistered speaker (for speaker verification) (Step 201), a voice is uttered (Step 202). The input voice signal is converted into an electric signal by the microphone 2 or the like (Step 203), and the electric signal is then subjected to high-frequency cutting by the low-pass filter 3 in accordance with a sampling theorem (at a cutoff frequency (Nyquist frequency) of 4.2 kHz) (Step 204). Then, the thus processed voice signal is subjected to analog-to-digital conversion by the A/D converter 4 (at a sampling frequency of 10 kHz and a quantization level of 16 bits) (Step 205), and a voice block is detected in terms of time; i.e., from which timing to which timing (Step 206). In this embodiment, the voice block is detected by comparing the power of the voice with a threshold, and the sum total of the power within the detected voice block is calculated (Step 207).

This embodiment involves 5 registered speakers for the learning by the neural network. For speaker identification, a total of 100 samples with 20 samples per registered speaker is used, while for speaker verification, a total of 200 samples including additional 100 samples that consists of 4 samples for each of 25 unregistered speakers is used.

A detailed flow chart of the preprocessing in the learning mode is shown in FIG. 9. An analysis block called a "frame" is set (Step 301). A frame length (the length of a single analysis block) is set to 25.6 msec and a frame cycle (a length for which the analysis block is shifted on the time domain) is set to 12.8 msec. Then, based on the total number of frames within the voice block, the voice block is equally divided timewise into m subblocks (4 subblocks in this embodiment) (Step 302). Thereafter, each frame is multiplied by a humming window to shut out high-frequency components at its end portions (Step 303). A spectrum is calculated by means of Fourier analysis (Fast Fourier Transform) (Step 304) and spectral power is calculated for each of n frequency bands (linear 16 channels in this embodiment, see Table 1) set on the frequency domain to obtain a rough spectral configuration (Step 305). The processing from Step 303 to Step 305 is repeated every frame.

TABLE 1

Exemplary frequency band division
(Linear 16 channels)

| Band No. | Frequencies [Hz] | Band No. | Frequencies [Hz] |
|---|---|---|---|
| 1 | 100–400 | 9 | 2500–2800 |
| 2 | 400–700 | 10 | 2800–3100 |
| 3 | 700–1000 | 11 | 3100–3400 |
| 4 | 1000–1300 | 12 | 3400–3700 |
| 5 | 1300–1600 | 13 | 3700–4000 |
| 6 | 1600–1900 | 14 | 4000–4300 |
| 7 | 1900–2200 | 15 | 4300–4600 |
| 8 | 2200–2500 | 16 | 4600–4900 |

After the processing from Step 303 to Step 305 has been completed with respect to all the frames, the processing result obtained per frame is averaged every subblock (Step 306), and to eliminate the influence of the voice level, the obtained average is normalized by dividing the sum total of the power within the voice block (calculated in Step 207 in the voice input section)(Step 307). As a result of the above processing, an m×n dimensional vector is adopted as an input pattern to the neural network and stored in a storage unit (such as a hard disk) together with the speaker information under such a correspondence as shown in Table 2 (Step 308).

TABLE 2

Exemplary Correspondence between
Learning Pattern and Speaker Information

| Pattern No. | Speaker Information | |
|---|---|---|
| | Identification | Verification |
| 1 | Registered speaker A | Registered speaker |
| 2 | Registered speaker B | Registered speaker |
| 3 | — | Unregistered speaker |
| ... | ... | ... |
| 200 | Registered speaker E | Registered speaker |

The neural network section will be described next. The neural network used in this embodiment is of a 3-layered "perceptron" type and has a total of 64 input units to match the m×n dimensional input pattern extracted as a result of the preprocessing. The number of output units is 5, the same as the number of registered speakers for speaker identification, and 2 for speaker verification, this number corresponding to the registered speaker and the unregistered speaker. It is known that the number of hidden units must exceed the number of output units. There are 20 hidden units in this embodiment, the number being 4 times the number of registered speakers.

Figure 10:
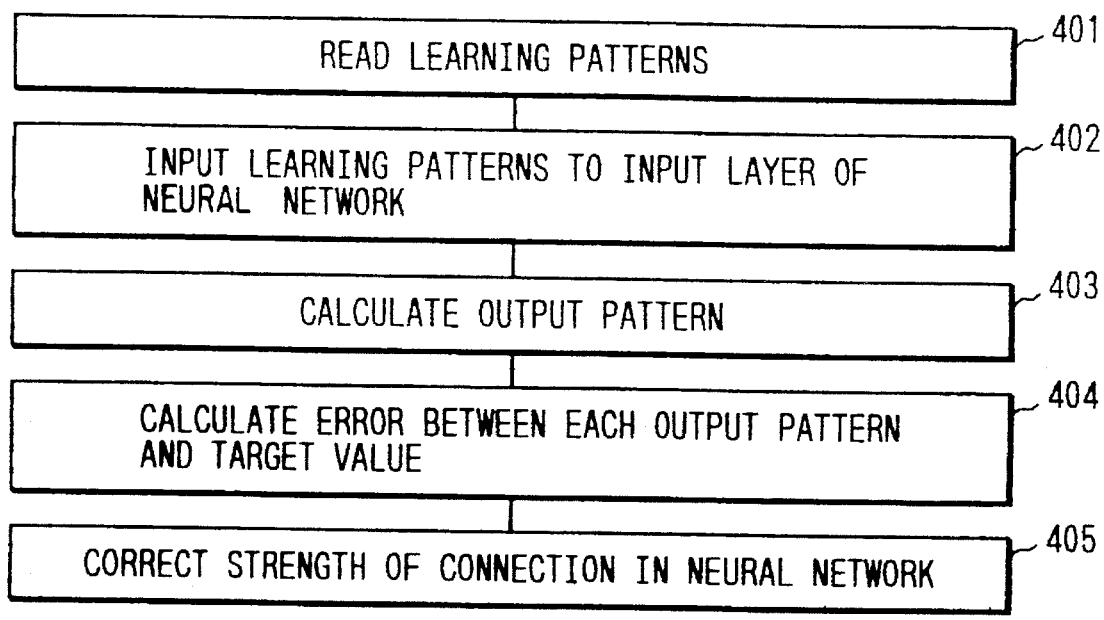
FIG. 10 is a flow chart of a neural network section in the learning mode.

A detail of the processing at the neural network section in the learning mode is shown in FIG. 10. Back propagation is used as the learning algorithm.

The learning patterns stored in the storage unit are read out (Step 401), and the read learning patterns are inputted into the input layer of the neural network (Step 402). Then, calculations are performed for the hidden and output layers of the neural network to obtain the output patterns (Step 403). An error between each obtained output pattern and the target value selected based on the corresponding speaker information is calculated (Step 404), and the connection strength with respect to the neural network is corrected so that the error is decreased (Step 405). As shown in Table 3, a target value is made to correspond between each of the output units whose total equals the total of the registered speakers and each registered speaker for speaker identification, the unit regarded as the speaker being "1" and the rest of the units being "0". For speaker verification, one of the two units corresponds to a registered speaker and the other to a unregistered speaker, the unit regarded as the speaker being "1" and the other being "0". In performing the learning process, the above Steps 402 to 405 are repeated. The steps may be repeated in any order, either in speaking order or randomly.

The processing shown in FIG. 10 is performed to all the learning patterns, and similar processing is repeated until the average of the errors observed during the respective processing becomes a predetermined value ($10^{-4}$ in this embodiment) or less.

TABLE 3

Target Value during Learning by Neural Network

| | Number of output units | Target value (Value of each output unit) |
|---|---|---|
| Speaker identification | 5 (Same as total registered speakers) | (1,0,0,0,0) corresponds to registered speaker A (0,1,0,0,0) corresponds to registered speaker B (0,0,0,0,1) corresponds to registered speaker E |
| Speaker verification | 2 | (1,0) corresponds to registered speakers (0,1) corresponds to unregistered speakers |

Detail of Speaker Recognition System (Activation Mode)

The processing in the activation mode shown in FIG. 7 will be described below.

Figure 11:
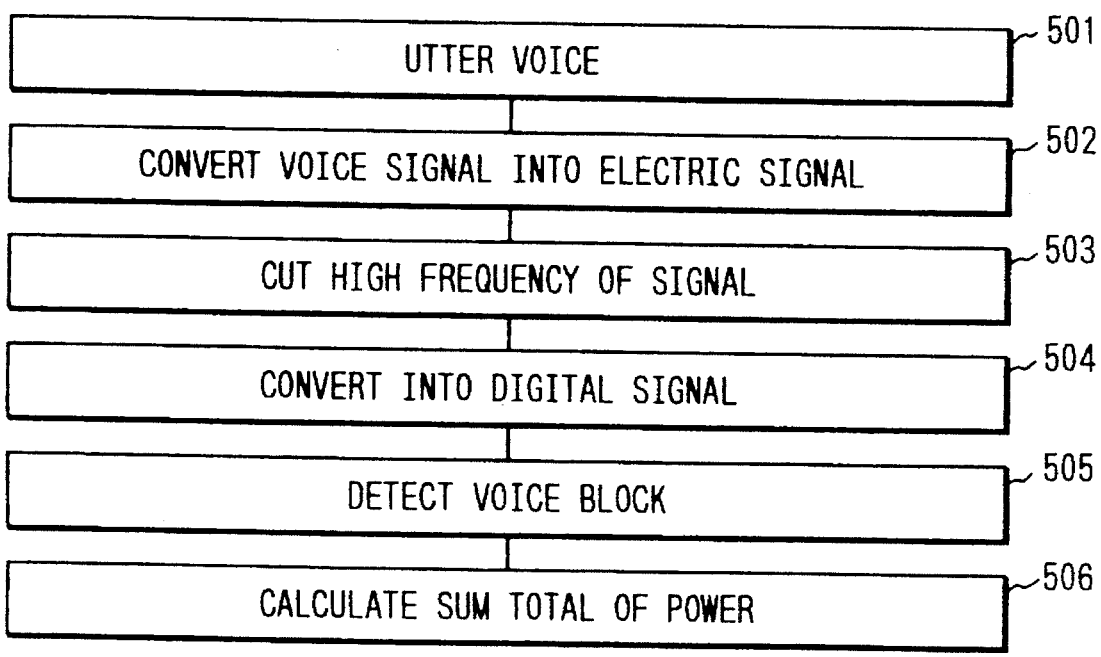
FIG. 11 is a flow chart of the voice input section in an activation mode.

A detailed flow chart of the processing at the voice input section in the activation mode is shown in FIG. 11. An input voice signal is converted into an electric signal by the microphone 2 or the like (Steps 501, 502) and has its high-frequency components cut by the low-pass filter 3 in accordance with the sampling theorem (at a cutoff frequency of 4.2 kHz) (Step 503). Then, the thus processed voice signal is subjected to analog-to-digital conversion by the A/D converter 4 (at a sampling frequency of 10 kHz and a quantization level of 16 bits) (Step 504), and the voice block is detected timewise; i.e., from which timing to which timing (Step 505). In this embodiment, the voice block is detected by comparing the voice power with a threshold. And the sum total of the power within the voice block is calculated (Step 506).

Figure 12:
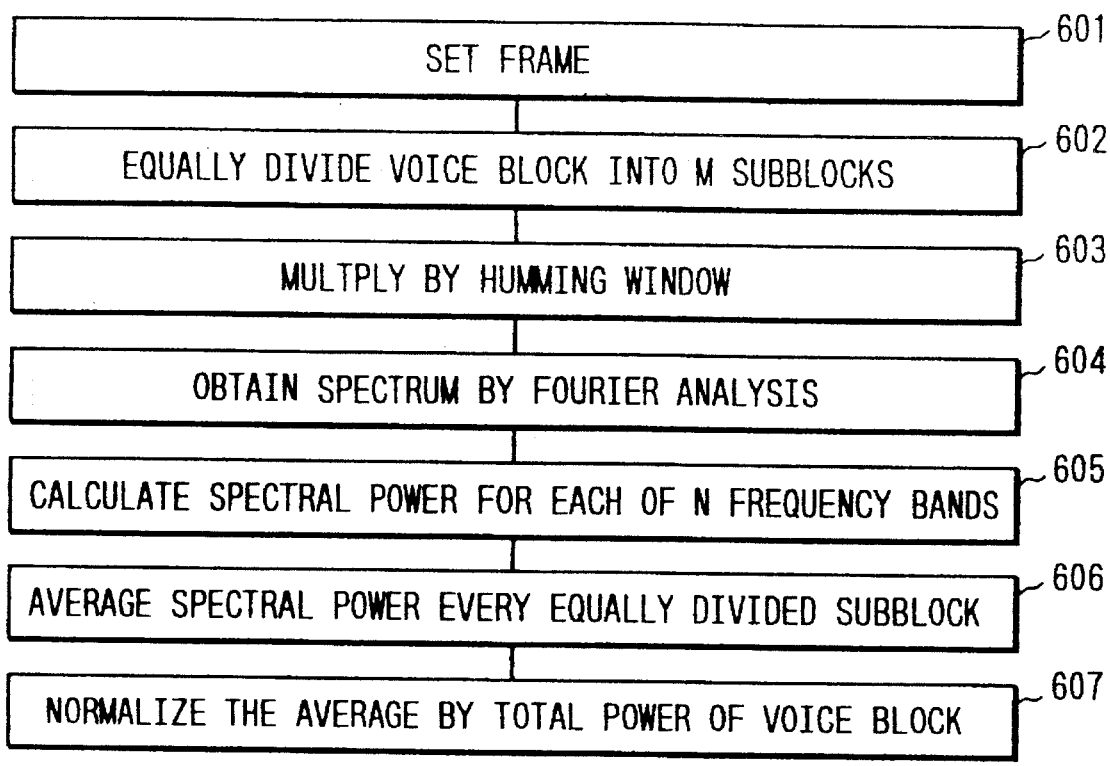
FIG. 12 is a flow chart of the preprocessing section in the activation mode.

A detailed flow chart of the processing at the preprocessing section in the activation mode is shown in FIG. 12. The analysis block called the "frame" is set (Step 601). The frame length is set to 25.6 msec and the frame cycle is set to 12.8 msec. Then, based on the total number of frames within the voice block, the voice block is equally divided timewise into m subblocks (4 subblocks in this embodiment) (Step 602). Thereafter, each frame is multiplied by a humming window to shut out high-frequency components at its end portions (Step 603). A spectrum is calculated by means of Fourier analysis (Fast Fourier Transform) (Step 604) and spectral power is calculated for each of n frequency bands (linear 16 channels) set on the frequency domain to obtain a rough spectral configuration (Step 605). The above processing from Step 603 to Step 605 is repeated every frame.

After the processing from Step 603 to Step 605 has been completed with respect to all the frames, the processing result obtained per frame is averaged every subblock (Step 606), and to eliminate the influence of the voice level, the obtained average is normalized by dividing the sum total of the power within the voice block (calculated in Step 506 in the voice input section)(Step 607). As a result of the above processing, an m×n dimensional vector is adopted as an input pattern to the neural network.

Figure 13:
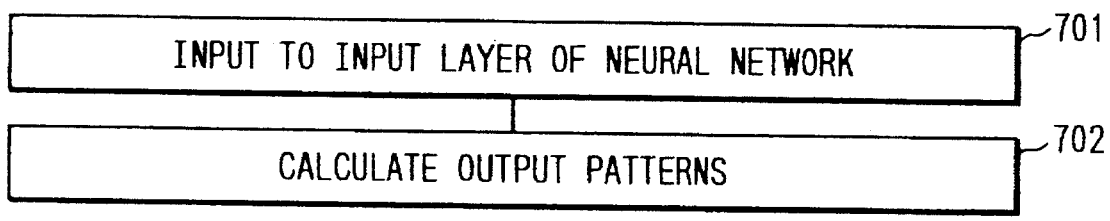
FIG. 13 is a flow chart of the neural network section in the activation mode.

A detailed flow chart of the processing at the neural network section in the activation mode is shown in FIG. 13. The extracted pattern obtained by preprocessing the input voice is inputted to the input layer of the neural network (Step 701). Then, calculations are performed for the hidden and output layers of the neural network to obtain the output patterns (Step 702). The neural network used in the activation mode must be through with learning.

The judgment section judges the speaker information on the input voice using the output patterns obtained in the activation mode. Specifically, for speaker identification, the speaker corresponding to the unit producing the maximum output, among the output units whose total is the same as that of the registered speakers, is presented as the judgment result, while for speaker verification, whether the input voice is a voice of a registered speaker's or a unregistered speaker's is judged by which of the two output units produces a larger output than the other.

Figure 14:
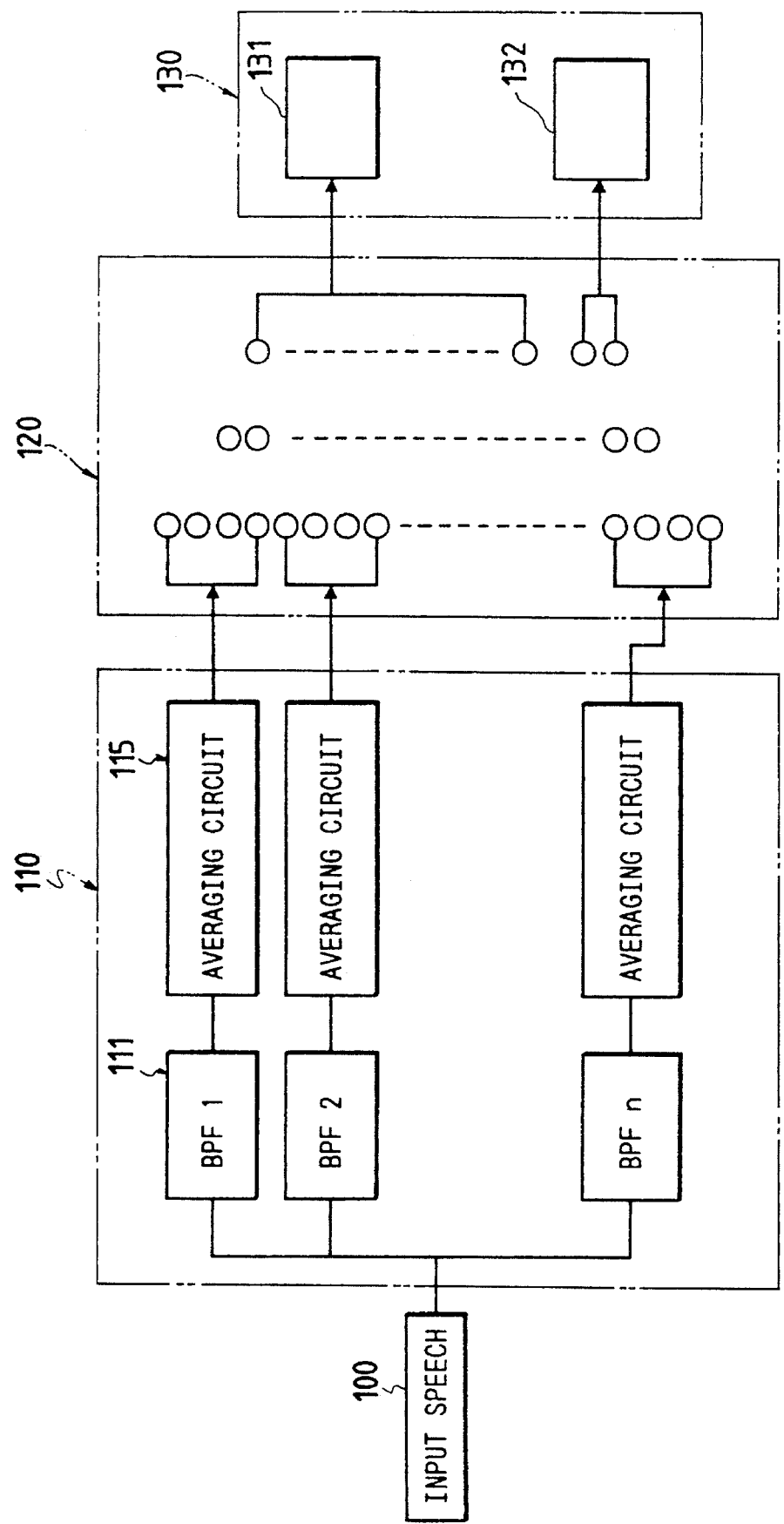
Figure 15:
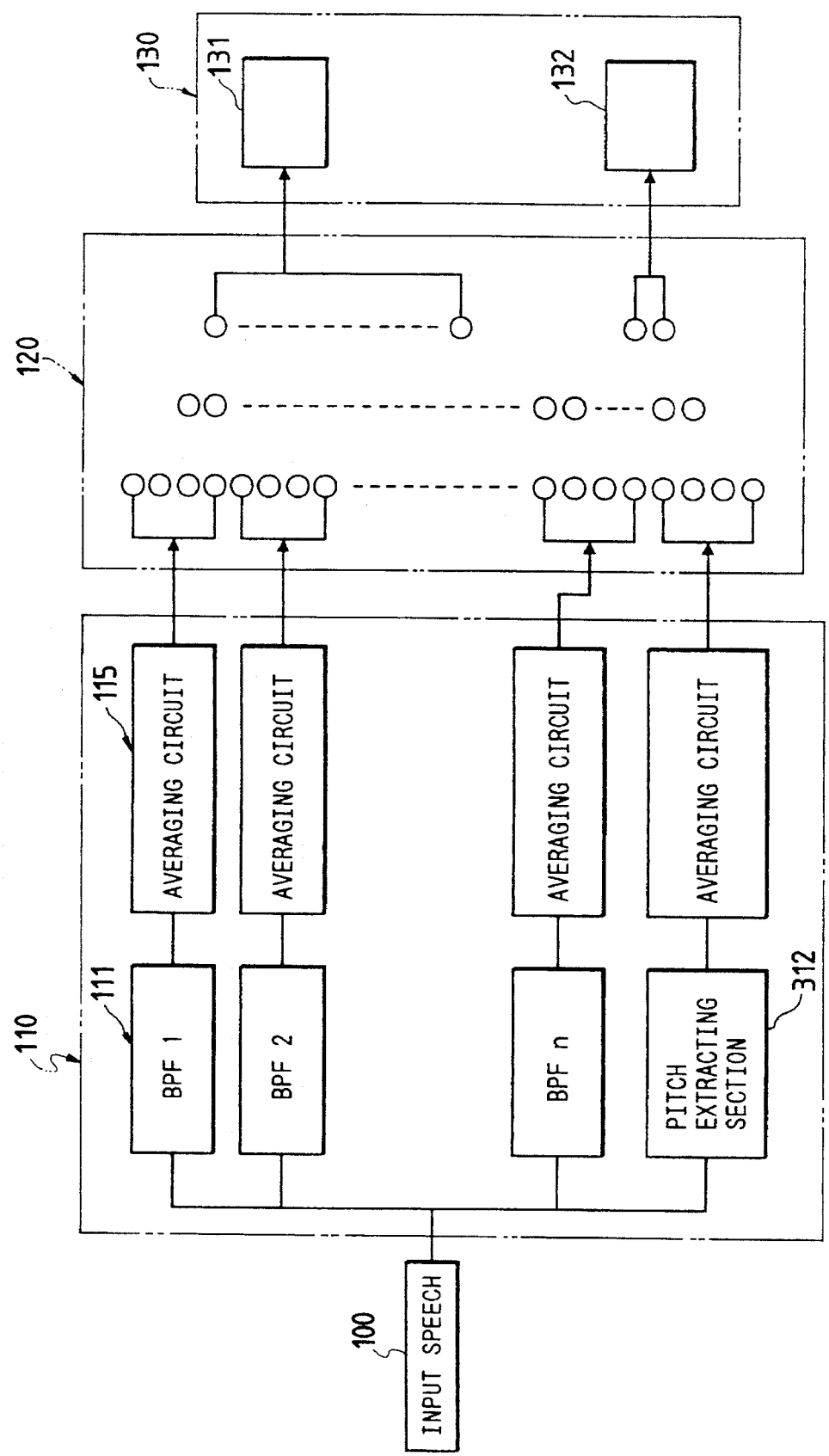
Figure 16:
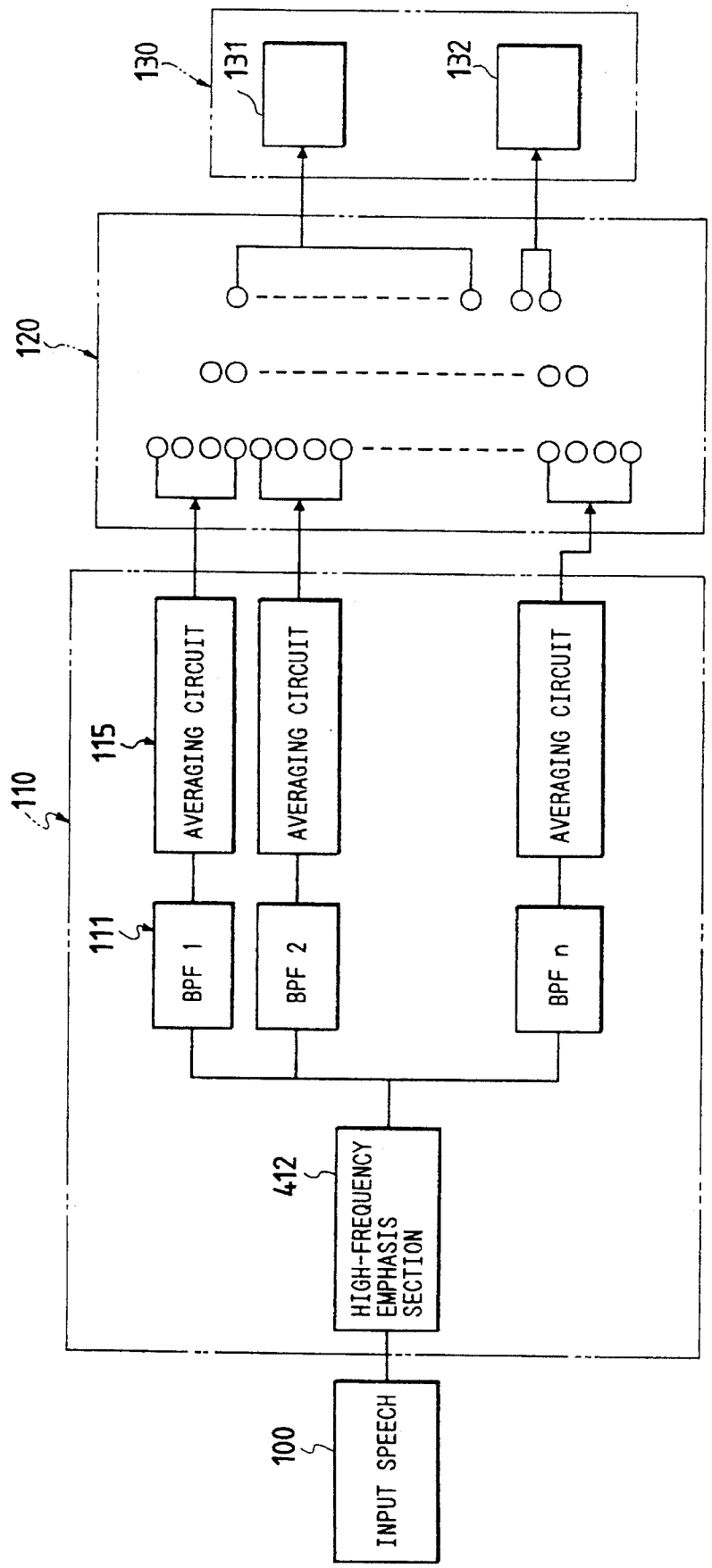
Figure 17:
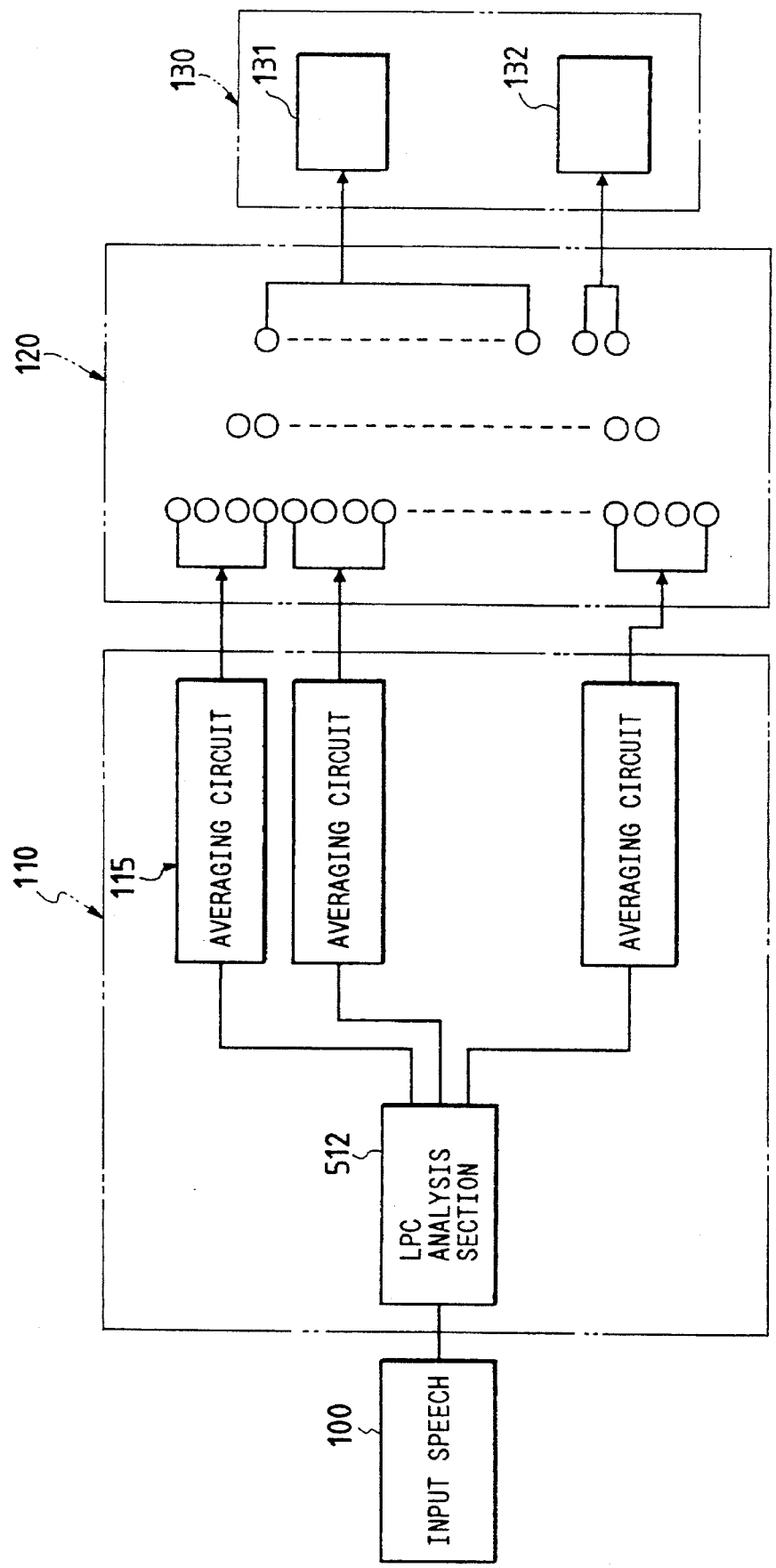

Specific schematic diagrams showing the speaker recognition system of the invention are shown in FIGS. 14 to 18. FIG. 14 shows an exemplary case where the feature quantity of an input voice is extracted by the average of the frequency characteristic of the voice. The system includes: a voice input section 100, a preprocessing section 110 consisting of bandpass filters 111 and averaging circuits 115; a neural network section 120; and a judgment section 130 consisting of a speaker identification judgment section 131 and a speaker verification judgment section 132. Similarly, FIG. 15 shows an exemplary case where the pitch frequency is used; FIG. 16 shows an exemplary case where an input voice is subjected to high-frequency emphasis; FIG. 17 shows an exemplary case where the input voice is subjected to a linear prediction analysis (LPC analysis); and FIG. 18 shows an exemplary case where the input voice is subjected to a PARCOR analysis.

Evaluation of Speaker Recognition System of the Invention

Voice samples used for the evaluation are shown in Table 4. For speaker identification, a total of 175 samples obtained from 5 registered speakers for 6 months are used, while for speaker verification, an additional 130 samples obtained from 26 unregistered speakers which are not used in the learning operation are used. The identification rate and the verification rate were both 100%. The processing speed was about 1 sec.

TABLE 4

Voice Samples Used for Evaluation

| Speaker identification | Speaker verification |
|---|---|
| 5 registered speakers A total of 175 samples (35 samples per speaker over a period of 6 months) | Same samples as left (175 samples per period) and additional 130 samples (5 samples per each of 26 unregistered speakers who are not used in learning) |

What is claimed is:

1. A speaker recognition system for identifying a speaker and verifying registration of a speaker based on an input voice, comprising:

a voice input section for inputting a voice;

a preprocessing section for extracting a feature quantity from said inputted voice and averaging said extracted feature quantity timewise;

a layered neural network for performing a predetermined operation based on an input pattern from said preprocessing section; and a speaker judgment section for judging identification or registration of said speaker based on an output from said neural network; wherein said preprocessing section divides said inputted voice into a plurality of frames that are timewise equal to one another, extracts a feature quantity for each frame, and averages together said feature quantity of each frame over a group of frames, thereby producing an input pattern for said layered neural network consisting of an extracted feature quantity which is timewise averaged.

2. A speaker recognition system according to claim 1, wherein said feature quantity of said inputted voice includes a frequency characteristic of said voice, a pitch frequency of said voice, a frequency characteristic of said voice whose high frequencies are subjected to emphasis, a linear prediction coefficient of said voice, and a PARCOR (partial self-correlation) coefficient of said voice.

3. A speaker recognition system according to claim 1, said system further comprising:

a function selection section for selecting a speaker identification function or a speaker verification function or both;

a registered speaker count setting section for setting the number of speakers to be preregistered in said system; and a mode selection section for selecting a mode from a mode in which learning is executed by said neural network or a mode in which speaker recognition is activated using said neural network that has completed said learning.

4. A speaker recognition system using a neural network comprising:

a function selection section for selecting a speaker identification function, a speaker verification function, or both;

a registered speaker count setting section for setting the number of speakers to be preregistered in said system;

a mode selection section for selecting a mode in which learning is executed by the neural network, or a mode in which speaker recognition is activated using said neural network that has completed said learning;

voice input section for inputting a voice and detecting a voice block from said voice;

a preprocessing section for extracting a feature quantity from said inputted voice by dividing said inputted voice into a plurality of frames that are timewise equal to one another, extracting a feature quantity from each frame, and averaging said extracted feature quantity for each frame over a group of frames, thereby producing an input pattern;

a layered neural network for performing a predetermined operation based on an input pattern from said preprocessing section;

a speaker judgment section for judging identity or registration of said speaker based on an output from said neural network; wherein in said learning mode, in response to a voice being input, together with speaker information identifying a speaker or indicating whether said speaker is a registered speaker, and a voice block being detected, said preprocessing section equally divides said voice block into m subblocks consisting of at least one frame, calculates spectral power of n frequency bands, said n frequency bands being set on the frequency domain for each frame, averages together the spectral power of each frame in a subblock for every equally divided subblock, generates an input pattern obtained from the result of averaging for input to said neural network, calculates an error between said obtained output pattern and a target value corresponding to said speaker information, determines a degree of strength of connection between units of the neural network for correction so that said error is decreased, and repeats said calculation of said error and said correction of said degree of strength of connection between said units until said error becomes below a predetermined value; and in said activation mode, in response to a voice being inputted and a voice block being detected, said preprocessing section equally divides said voice block into m subblocks, calculates spectral power for each of n frequency bands, said n frequency bands being set on the frequency domain for each frame, averages together said spectral power of each frame in a subblock for every equally divided subblock, and transmits an input pattern obtained from the result of averaging to said neural network that has completed said learning; and said judgment section judges the identity of the speaker from said obtained output pattern in an identification function and the registration of the speaker in a verification function wherein m and n are integers.

5. A speaker recognition system for identifying a speaker and verifying registration of a speaker based on an input voice, comprising:

a voice input section for inputting a voice;

a preprocessing section for extracting a feature quantity from each of a plurality of frames which said input voice is divided into with a predetermined period;

a layered neural network for performing a predetermined operation based on an input pattern from said preprocessing section; and a speaker judgement section for judging identification or registration of said speaker based on an output from said neural network;

wherein said preprocessing section includes means for producing said input pattern in the manner that said plurality of frames are grouped into a plurality of groups, a total number of the groups is less than a total number of the frames, each of the groups includes a substantially equal number of frames, and said feature quantities in each of the groups are averaged to produce said input pattern of the neural network.

6. A speaker recognition system according to claim 5, wherein said feature quantity of said input voice is one of a frequency characteristic of said voice, a pitch frequency of said voice, a frequency characteristic of said voice whose high frequencies are subjected to emphasis, a linear prediction coefficient of said voice, and a PARCOR (partial self-correlation) coefficient of said voice.

7. A speaker recognition system according to claim 5, wherein said system further comprises:

a function selection section for selecting at least one of a speaker identification function and a speaker verification function;

a registered speaker count setting section for setting the number of speakers to be preregistered in said system; and a mode selection section for selecting a mode in which learning is executed by said neural network or a mode in which speaker recognition is activated using said neural network that has completed said learning.

8. A speaker recognition system using a neural network comprising:

a function selection section for selecting at least one of a speaker identification function and a speaker verification function;

a registered speaker count setting section for setting the number of speakers to be preregistered in said system;

a mode selection section for selecting a mode in which learning is executed by the neural network, or a mode in which speaker recognition is activated using said neural network that has completed said learning;

a voice input section for inputting a voice and detecting a voice block from said voice;

a preprocessing section for extracting a feature quantity from each of a plurality of frames which said input voice is divided into with a predetermined period;

a layered neural network for performing a predetermined operation based on an input pattern from said preprocessing section; and a speaker judgement section for judging an identity or a registration of said speaker based on an output from said neural network;

wherein said preprocessing section includes means for producing said input pattern in the manner that said plurality of frames are grouped into a plurality of groups, a total number of the groups is less than a total number of the frames, each of the groups includes a substantially equal number of frames, and said feature quantities in each of the groups are averaged to produce said input pattern of the neural network; and wherein, in said learning mode, in response to a voice being input, together with speaker information identifying a speaker or indicating whether said speaker is a registered speaker, and a voice block being detected, said preprocessing section equally divides said voice block into m subblocks including at least one frame, calculates spectral power of n frequency bands, said frequency bands being set on the frequency domain for each frame, averages together the spectral power of each frame in a subblock for every equally divided subblock, generates an input pattern obtained from the result of averaging for input to said neural network, calculates an error between said obtained output pattern and a target value corresponding to said speaker information, determines a degree of strength of connection between units of the neural network for correction so that said error is decreased, and repeats said calculation of said error and said correction of said degree of strength of connection between said units until said error becomes below a predetermined value; and in said activation mode, in response to a voice being inputted and a voice block being detected, said preprocessing section equally divides said voice block into m subblocks, calculates spectral power for each of n frequency bands, said n frequency bands being set on the frequency domain for each frame, averages together said spectral power of each frame in a subblock for every equally divided subblock, and transmits an input pattern obtained from the result of averaging to said neural network that has completed said learning; and said judgement section judges the identity of the speaker from said obtained output pattern in an identification function mode and the registration of the speaker in a verification function mode wherein m and n are integers.

* * * * *